(12) United States Patent
Guo

(10) Patent No.: US 10,879,974 B2
(45) Date of Patent: Dec. 29, 2020

(54) ELECTRONIC DEVICE AND ANTENNA COMPONENT THEREOF

(71) Applicant: Beijing Xiaomi Mobile Software Co., Ltd., Beijing (CN)

(72) Inventor: Fang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/412,799

(22) Filed: May 15, 2019

(65) Prior Publication Data
US 2019/0372635 A1    Dec. 5, 2019

(30) Foreign Application Priority Data
May 29, 2018   (CN) .......................... 2018 1 0533925

(51) Int. Cl.
*H01Q 1/24* (2006.01)
*H04B 7/06* (2006.01)
(Continued)

(52) U.S. Cl.
CPC ........... *H04B 7/0602* (2013.01); *H01Q 1/364* (2013.01); *H01Q 1/38* (2013.01); *H04B 1/406* (2013.01); *H04W 84/12* (2013.01)

(58) Field of Classification Search
CPC ........ H01Q 1/241–1/243; H01Q 13/10; H04B 7/04–7/06
See application file for complete search history.

(56) References Cited

U.S. PATENT DOCUMENTS 7,079,079 B2 * 7/2006 Jo ................. H01Q 1/243
343/700 MS
8,907,853 B2 * 12/2014 Ying .............. H01Q 1/243
343/702
(Continued)

FOREIGN PATENT DOCUMENTS

CN      204596970 U    8/2015
CN      105244599 A    1/2016
(Continued)

OTHER PUBLICATIONS

Korean Office Action dated Dec. 11, 2019, in counterpart Korean Application No. 10-2019-7012208.
(Continued)

*Primary Examiner* — Hasan Z Islam
(74) *Attorney, Agent, or Firm* — Finnegan, Henderson, Farabow, Garrett & Dunner, L.L.P.

(57) ABSTRACT

The present disclosure relates to an electronic device and an antenna component thereof. The antenna component includes a conductive frame and a signal generation circuit. The conductive frame includes a first conductive frame section and a second conductive frame section, and a slit therebetween is configured to implement signal radiation of the antenna component. A feed point is provided on the first conductive frame section near the slit. The first conductive frame section includes an extension portion from the feed point to an end away from the silt. A groove is formed by the extension portion and a first ground element. The signal generation circuit is electronically connected to the feed point, and configured to generate an L5 band signal when a signal source is input to the signal generation circuit, such that the groove generates an L1 band signal.

15 Claims, 4 Drawing Sheets

(51) Int. Cl.
*H01Q 1/36* (2006.01)
*H01Q 1/38* (2006.01)
*H04B 1/403* (2015.01)
*H04W 84/12* (2009.01)

(56) References Cited

U.S. PATENT DOCUMENTS

| | | | | |
|---|---|---|---|---|
| 10,424,844 | B2* | 9/2019 | Lee | H01Q 1/521 |
| 2011/0136447 | A1* | 6/2011 | Pascolini | H01Q 9/42 |
| | | | | 455/90.2 |
| 2013/0194138 | A1* | 8/2013 | Hammond | H01Q 1/243 |
| | | | | 343/702 |
| 2016/0164168 | A1 | 6/2016 | Choi et al. | |
| 2017/0244153 | A1 | 8/2017 | Chen et al. | |
| 2017/0279199 | A1* | 9/2017 | An | H01Q 21/28 |
| 2017/0346159 | A1* | 11/2017 | Xue | H01Q 5/314 |
| 2018/0375193 | A1 | 12/2018 | Zhang et al. | |
| 2019/0081394 | A1* | 3/2019 | Edwards | H01Q 1/243 |

FOREIGN PATENT DOCUMENTS

| | | |
|---|---|---|
| CN | 105762515 A | 7/2016 |
| CN | 105789884 A | 7/2016 |
| CN | 107069212 A | 8/2017 |
| CN | 107204509 A | 9/2017 |
| CN | 107425258 A | 12/2017 |
| CN | 108039563 A | 5/2018 |
| KR | 20160146138 A | 12/2016 |

OTHER PUBLICATIONS

First Office Action issued by the State Intellectual Property Office (SIPO) of the People's Republic of China (PRC) dated Apr. 28, 2019, in counterpart Chinese Patent Application No. 201810533925.0.

International Search Report issued by the State Intellectual Property Office (SIPO) of the People's Republic of China (PRC) dated Jan. 30, 2019, in counterpart International Application No. PCT/CN2018/115829.

Second Office Action issued by the State Intellectual Property Office (SIPO) of the People's Republic of China (PRC) dated Oct. 18, 2019, in counterpart Chinese Patent Application No. 201810533925.0.

European Office Action issued by the European Patent Office dated Aug. 19, 2019, in counterpart European Application No. 19175611.3-1205.

* cited by examiner

ELECTRONIC DEVICE AND ANTENNA COMPONENT THEREOF

CROSS-REFERENCE TO RELATED APPLICATIONS

This application is based upon and claims priority to Chinese Patent Application No. 201810533925.0, filed on May 29, 2018, the entire content of which is incorporated herein by reference.

TECHNICAL FIELD

The present disclosure generally relates to the antenna technology field, and more particularly, to an electronic device and an antenna component thereof.

BACKGROUND

With increasing use of electronic devices, such as mobile phones and tablet computers, in people's daily life, people are constantly putting forward new demands on structure and function of the electronic devices, such as requiring a smaller device, a larger screen-to-body ratio, a metal housing with a better hand feeling.

However, a change in the structure or the function of an electronic device may affect performance of an antenna component, thereby affecting the basic communication function of the electronic device and reducing user experience.

SUMMARY

According to a first aspect of embodiments of the present disclosure, there is provided an antenna component, including a conductive frame and a signal generation circuit. The conductive frame includes a first conductive frame section and a second conductive frame section. The first conductive frame section and the second conductive frame section are formed by splitting the conductive frame with a slit of the conductive frame. A feed point is provided on the first conductive frame section near the slit. The first conductive frame section includes an extension portion from the feed point to an end away from the silt. A groove is formed by the extension portion and a first ground element. The signal generation circuit is electronically connected to the feed point, and configured to generate an L5 band signal when a signal source is input to the signal generation circuit, such that the groove generates a L1 band signal.

According to a second aspect of embodiments of the present disclosure, there is provided an electronic device, including an antenna component. The antenna component includes a conductive frame and a signal generation circuit. The conductive frame includes a first conductive frame section and a second conductive frame section. The first conductive frame section and the second conductive frame section are formed by splitting the conductive frame with a slit of the conductive frame. A feed point is provided on the first conductive frame section near the slit. The first conductive frame section includes an extension portion from the feed point to an end away from the silt. A groove is formed by the extension portion and a first ground element. The signal generation circuit is electronically connected to the feed point, and configured to generate an L5 band signal when a signal source is input to the signal generation circuit, such that the groove generates a L1 band signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. Terms such as first, second or third may be used to describe various information but the information is not limited by the above terminologies. The above terminologies are used to distinguish one type of information from the other type of information, for example, first information may be referred to as second information without departing from a scope in accordance with the concept of the present disclosure and similarly, second information may be referred to as first information. As used herein, the term "if" may be construed to mean "when" or "upon" or "in response to determining" depending on the context.

With development of information technology, the technology of satellite positioning system has made great progress and is fully utilized in electronic devices such as smart phones and tablet computers. In order to improve positioning accuracy of satellite navigation, a GPS (Global Positioning System) signal with a frequency band of 1176.45 MHz (L5 band signal) has been added as a civilian signal on the basis of an original working frequency band. Correspondingly, in order to improve the positioning accuracy of an electronic device, it is also necessary to add a corresponding frequency band in the electronic device.

In the related art, on the basis of the original frequency band of the electronic device, the electronic device supports the L5 band signal by adding an antenna operating on the L5 band signal. However, a specification size of the electronic device is limited for user demands such as portability. Although the addition of the antenna can support the L5 band signal, it takes up too much space inside the electronic device. Further, in the case of limited internal space, the newly added antenna seriously occupies radiation space of an original antenna. For example, the frequency difference between the L1 band signal (1.575 GHz) and the L5 band signal is small, resulting in poor isolation between antennas operating on the L band signal and the L5 band signal. The newly added antenna (the antenna operating on the L5 band signal) seriously affects performance of the antenna operating on the original L1 band signal.

Therefore, the present disclosure aims to solve above technical problems existing in the related art by improving a manner of generating the L5 band signal. An antenna component according to embodiments of the present disclosure is applied to an electronic device, including two parts: a conductive frame and a signal generation circuit. In the following, the conductive frame and the signal generation circuit will be respectively described in detail with reference to specific scenarios and drawings.

1. The Conductive Frame

Figure 1:
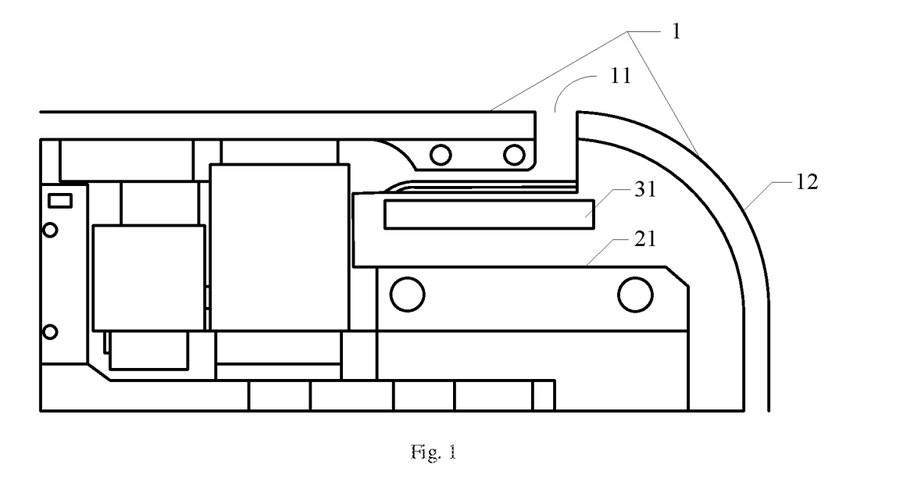
FIG. 1 is a schematic diagram illustrating a conductive frame according to an exemplary embodiment of the present disclosure.

FIG. 1 is a schematic diagram illustrating a conductive frame 1 according to an exemplary embodiment of the present disclosure. As illustrated in FIG. 1, the conductive frame 1 may be a metal frame of the electronic device. What is illustrated in FIG. 1 is an upper right corner of the electronic device. The conductive frame 1 includes a first conductive frame section 12 and a second conductive frame section. The first conductive frame section 12 and the second conductive frame section are formed by splitting the conductive frame with a slit 11 of the conductive frame. The slit 11 is configured to implement signal radiation of the antenna component. The first conductive frame section 12 is formed by splitting the conductive frame with the slit. A feed point (not shown) is provided on the first conductive frame section 12 near the slit 11. The first conductive frame section 12 includes an extension portion from the feed point to an end away from the silt 11, and a groove is formed by the extension portion and a first ground element 21. The first ground element 21 may include any one of a frame of the electronic device, a screen module, and a printed-circuit board.

Figure 2:
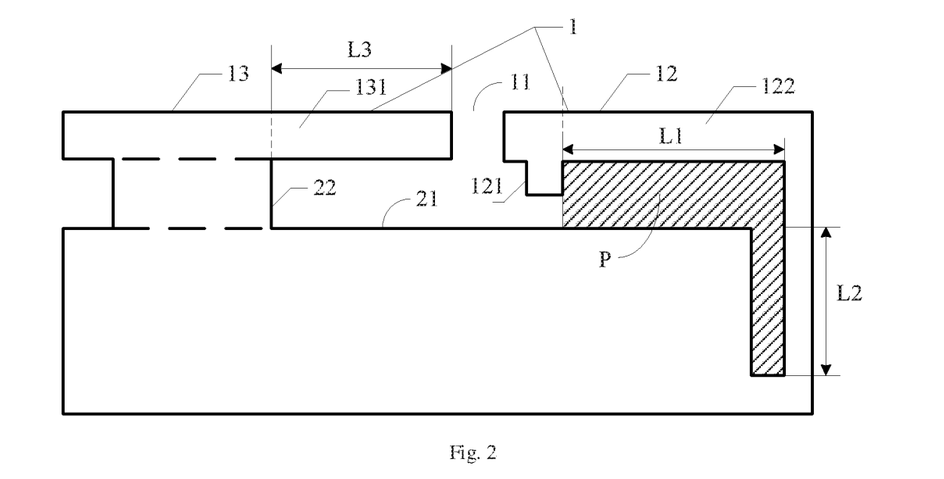
FIG. 2 is a schematic diagram illustrating a conductive frame according to another exemplary embodiment of the present disclosure.

FIG. 2 is a specification diagram of, the metal structure in FIG. 1. As illustrated in FIG. 2, the first conductive frame section 12 includes an extension portion 122 from a feed point 121 to the end away from the silt 11, i.e., a right direction in FIG. 2. A groove P is formed by the extension portion 122 and the first ground element 21. A length of the groove P is, e.g., no less than 20 mm. It should be noted that, a shape of the groove P in the antenna component varies with a position of the antenna component. For example, the conductive frame illustrated in FIG. 1 and FIG. 2 is an upper top portion of the electronic device, thus the formed groove P is an "L" shape. In exemplary embodiments, the groove P may be any other shapes, which is not limited in the present disclosure.

2. The Signal Generation Circuit

The signal generation circuit is electronically connected to the feed point 121 in FIG. 2. The signal generation circuit is configured to generate an L5 band signal when a signal source is input to the signal generation circuit, such that the groove P generates a L1 band signal. It can be seen that the antenna component according to an embodiment of the present disclosure may generate the L5 band signal and the L1 band signal in a case of using only one feed point, without a need to newly add an antenna operating on the L5 band signal to realized support of the L5 band signal by the electronic device, thus saving internal space of the electronic device. At the same time, a problem of squeezing the radiation space of the original antenna (the antenna operating on the L band signal) due to the newly added antenna (the antenna operating on the L5 band signal) is avoided, thereby improving the performance of the antenna component.

Composition of the signal generation circuit will be described in detail with reference to circuit diagrams in the following.

Figure 3:
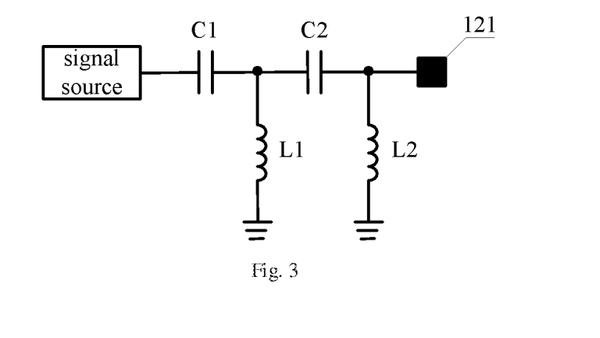
FIG. 3 is a schematic diagram illustrating a signal generation circuit according to an exemplary embodiment of the present disclosure.

In some embodiments, as illustrated in FIG. 3, the signal generation circuit may include a first capacitor C1, a second capacitor C2, a first inductor L1, and a second inductor L2. The first capacitor C is connected to the second capacitor C2 in series, and the first capacitor C1 is connectable to a signal source. The second capacitor C2 is connected between the feed point 121 and the first capacitor C1. A first end (i.e., an upper end of L1 illustrated in FIG. 3) of the first inductor L is connected to a first end (i.e., a left end of C2 illustrated in FIG. 3) of the second capacitor C2, a second end (i.e., a lower end of L1 illustrated in FIG. 3) of the first inductor L is grounded. A first end (i.e., an upper end of L2 illustrated in FIG. 3) of the second inductor L2 is connected to a second end (i.e., a right end of C2 illustrated in FIG. 3) of the second capacitor C2, a second end (i.e., a lower end of L2 illustrated in FIG. 3) of the second inductor L2 is connected to the ground.

For example, parameter values of respective components in the signal generation circuit illustrated in FIG. 3 may be set as Table 1.

TABLE 1

| component | value |
| --- | --- |
| first capacitor C1 | 0.7 pF |
| second capacitor C2 | 0.8 pF |
| first inductor L1 | 7.5 nH |
| second inductor L2 | 10 nH |

Figure 4:
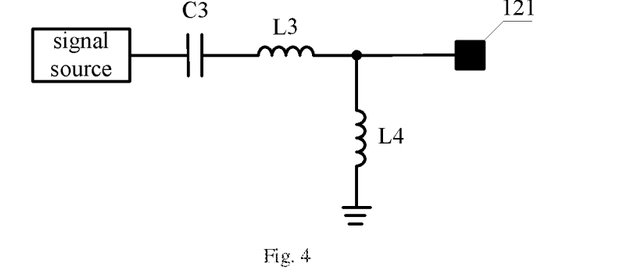
FIG. 4 is a schematic diagram illustrating a signal generation circuit according to another exemplary embodiment of the present disclosure.

In some embodiments, as illustrated in FIG. 4, the signal generation circuit may include a third capacitor C3, a third inductor L3, and a fourth inductor L4. The third capacitor C3 is connectable to the signal source. The third inductor L3 is connected to the third capacitor C3 in series, and is connected between the feed point 121 and the third capacitor C3. A first end (i.e., an upper end of L4 illustrated in FIG. 4) of the fourth inductor L4 is connected to a first end (i.e., a right end of L3 illustrated in FIG. 4) of the third inductor L3, in which the first end of the third inductor L3 is closer to the feed point 121 than a second end of the third inductor L3, a second end (i.e., a lower end of L4 illustrated in FIG. 4) of the fourth inductor L4 is grounded.

For example, parameter values of respective components in the signal generation circuit illustrated in FIG. 4 may be set as Table 2.

TABLE 2

| component | value |
|---|---|
| third capacitor C3 | 1 pF |
| third inductor L3 | 8.2 nH |
| fourth inductor L4 | 10 nH |

It should be noted that, parameter values of respective components in the signal generation circuit illustrated in FIG. 3 and FIG. 4 may be flexibly adjusted according to practical situation, which is not limited in the present disclosure.

Figure 5:
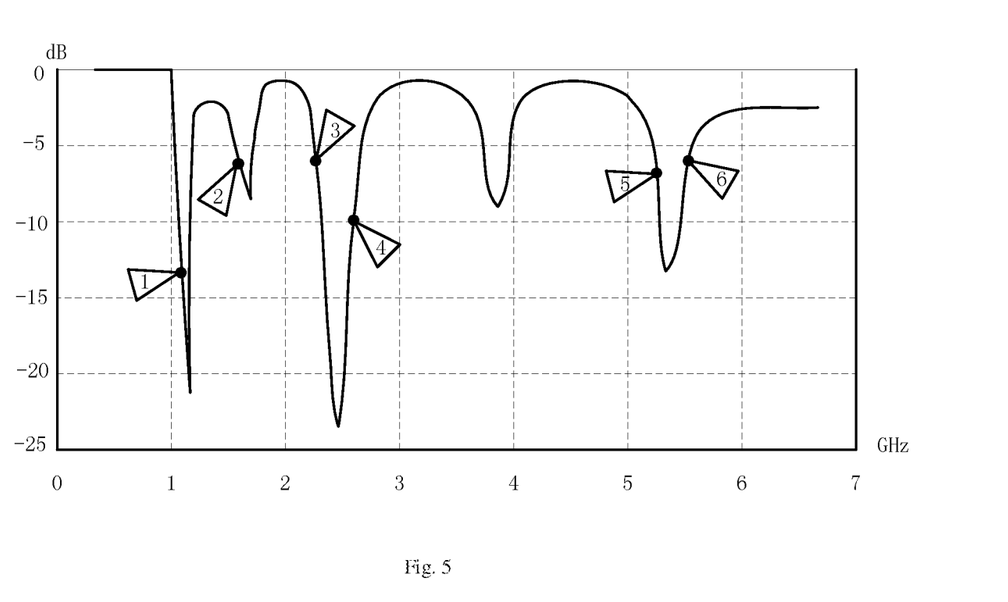
FIG. 5 is a schematic diagram illustrating return loss of a four-frequency antenna according to an exemplary embodiment of the present disclosure.

In some embodiments, structure operating on a Wi-Fi signal (including a 2.4 GHz band signal and 5 GHz band signal) may further be added based on the above-mentioned antenna component, thus realizing a structure of four-frequency antenna. i.e., generating all of the L5 band signal, the L band signal, the 2.4 GHz band signal, and the 5 GHz band signal, by using only one feed point. For example, by controlling parameter values of respective components, return loss of the four-frequency antenna may be adjusted as illustrated in FIG. 5. Coordinates of respective points illustrated in FIG. 5 may be set as Table 3.

TABLE 3

| point | coordinate |
|---|---|
| 1 | (1.176, −13.576) |
| 2 | (1.5943, −7.3602) |
| 3 | (2.4, −6.1204) |
| 4 | (2.5, −10.116) |
| 5 | (5.1235, −7.2976) |
| 6 | (5.4155, −6.3856) |

With the four-frequency antenna structure, internal space of the electronic device may be saved. At the same time, the problem of squeezing the radiation space of the original antenna caused by newly added antenna, thus improving performance of the antenna component. Technical solutions for generating the 5 GHz band signal and the 2.4 GHz band signal will be described in the following.

1. 5 GHz Band Signal

If the signal source is input to the signal generation circuit, the groove P illustrated in FIG. 2 may be further configured to generate a 5 GHz band signal. As an exemplary embodiment, a fundamental mode of the groove P may be configured to generate the L1 band signal, and a high order mode of the groove P may be configured to generate the 5 GHz band signal. A shape and a length (which is, e.g., no less than 20 mm) of the groove P may be flexibly set according to practical situation, which is not limited herein.

2. 2.4 GHz Band Signal

1) Second conductive frame section 13

In the antenna component according to some embodiments of the present disclosure, the 2.4 GHz band signal may be generated by a second conductive frame section 13 formed by splitting the conductive frame 1 with the slit 11. As illustrated in FIG. 2, the second conductive frame section 13 is electronically connected to a second ground element 22. The second ground element 22 may include any one of a frame of the electronic device, a screen module, and a printed-circuit board. It should be noted that, the first ground element 21 and the second ground element 22 may be a same ground element or different ground elements independent of each other. When the first ground element 21 and the second ground element 22 are different ground elements independent of each other, electric potentials of the first ground element 21 and the second ground element 22 are equal, and they are equal to an electric potential of ground in the signal generation circuit.

For a length of a portion 131 (in an extending direction of the second conductive frame section 13) of the second conductive frame section 13 exceeding beyond the second ground element 22, there may be two cases.

(1) The Length of the Portion 131 is Less than a Preset Threshold.

Figure 6:
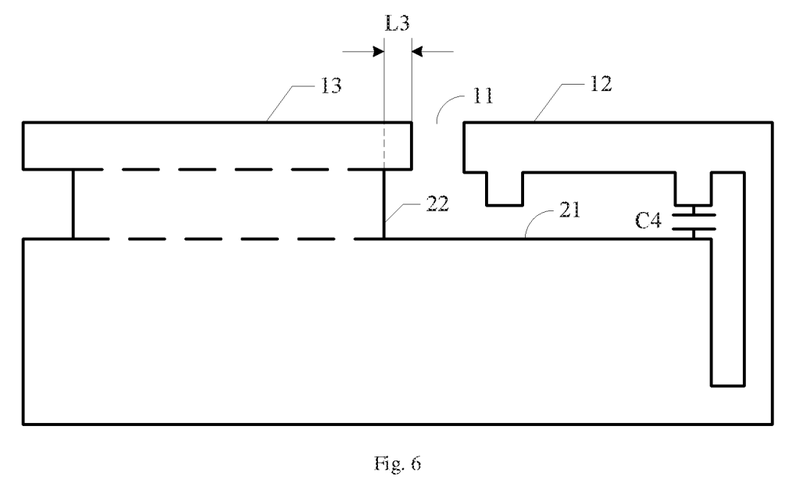
FIG. 6 is a schematic diagram illustrating a conductive frame according to another exemplary embodiment of the present disclosure.

As illustrated in FIG. 2, in the extending direction (i.e., a landscape orientation illustrated in FIG. 2) of the second conductive frame section 13, when the length L3 (i.e., a landscape orientation length of the portion 131) of the portion of the second conductive frame section 13 exceeding beyond the second ground element 22 is less than the preset threshold, support of the 2.4 GHz band signal may be realized by adding a new capacitor between the first conductive frame 12 and the ground. As an exemplary embodiment, the antenna component according to embodiments of the present disclosure may further include a fourth capacitor C4. A first end (i.e., an upper end of C4 illustrated in FIG. 6) of the fourth capacitor C4 is connected to the first conductive frame section 12, and a second end (i.e., a lower end of C4 illustrated in FIG. 6) of the fourth capacitor C4 is connected to the ground. It should be noted that, positions of the first conductive frame 12 and the fourth capacitor C4 may be flexibly set according to practical situation, which is not limited in the present disclosure. For example, as illustrated in FIG. 6, the fourth capacitor C4 may be connected to a middle portion of the first conductive frame 12. A specific value of the fourth capacitor C4 may be flexibly set according to practical situation, which is not limited in the present disclosure. For example, the fourth capacitor C4 may be 1 pF.

For a grounding manner, a lower end of the fourth capacitor C4 may be connected to the first ground element 21. In addition, a specific value of the preset threshold may be flexibly set according to practical situation, which is not limited in the present disclosure. For example, the preset threshold may be 5 mm, 6.2 mm, etc.

(2) The Length of the Portion 131 is Greater than a Preset Length.

As illustrated in FIG. 2, in the extending direction (i.e., a landscape orientation illustrated in FIG. 2) of the second conductive frame section 13, when the length of the portion of the second conductive frame section 13 exceeding beyond the second ground element 22 is greater than the preset length, that is, a landscape orientation length of the portion 131 is greater than the preset length, support of the 2.4 GHz band signal may be realized by the portion 131. As an exemplary embodiment, in the extending direction of the second conductive frame section 13, the length of the portion of the second conductive frame section 13 exceeding beyond the second ground element 22 is greater than the preset length. If the signal source is input to the signal generation circuit, the portion 131 of the second conductive frame section 13 exceeding beyond the second ground element 22 is configured to generate a 2.4 GHz band signal.

A specific value of the preset length may be flexibly set according to practical situation, which is not limited in the present disclosure. For example, the preset length is no less than 10 mm.

Figure 7:
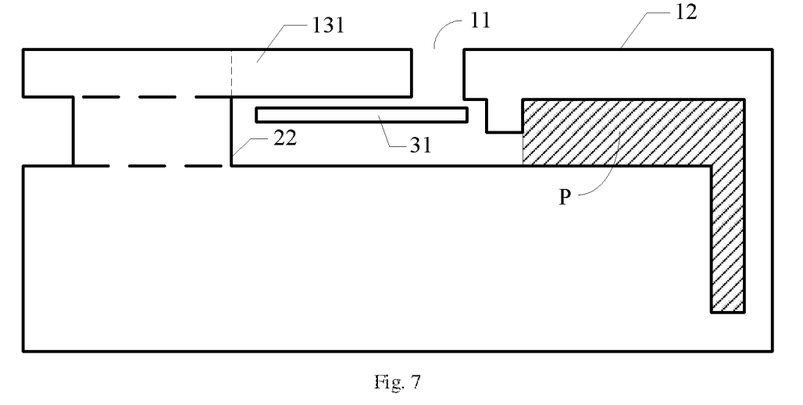
FIG. 7 is a schematic diagram illustrating a conductive frame according to another exemplary embodiment of the present disclosure.

In some embodiments, frequencies of respective signals generated by the antenna component may be slightly adjusted by adding a conductive branch. As an exemplary embodiment of the present disclosure, as illustrated in FIG. 2 and FIG. 7, the antenna component according to an embodiment of the present disclosure may further include a conductive branch 31. The conductive branch 31 is located between the first ground element 21 and the portion 131 of the second conductive frame section 13 exceeding beyond the second ground element 22. When the signal source is input to the signal generation circuit, a distance between the conductive branch 31 and the second conductive frame section 13 and a length of the conductive branch 31 in a preset direction are associated with a frequency of any one of signals generated by the signal generation circuit, the groove P, and the portion 131 of the second conductive frame section 11 exceeding beyond the second ground element 22.

For example, as illustrated in FIG. 2 and FIG. 7, the closer the distance between the conductive branch 31 and the second conductive frame section 13 is, the lower the frequency of any one of the signals generated by the signal generation circuit, the groove P, and the portion 131 is. The greater a vertical length (also understood as a width of the conductive branch 31) of the conductive branch 31 is, the lower the frequency of any one of the signals generated by the signal generation circuit, the groove P, and the portion 131 is. The greater a landscape length (also understood as a length of the conductive branch 31) of the conductive branch 31 is, the lower the frequency of any one of the signals generated by the signal generation circuit, the groove P, and the portion 131 is. The conductive branch 31 may be any one of a metal piece, a LDS (laser direct structuring) pattern (i.e., a pattern directly formed by laser forming), and a FPC (flexible printed circuit).

2) The Signal Generation Circuit

Figure 8:
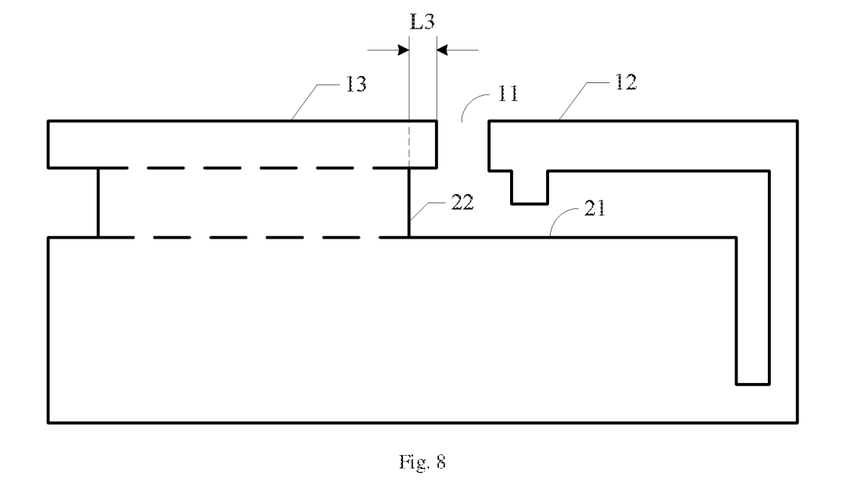
FIG. 8 is a schematic diagram illustrating a conductive frame according to another exemplary embodiment of the present disclosure.

In an exemplary embodiment, the 2.4 GHz band signal may be generated by the signal generation circuit. That is, the signal generation circuit may generate the 2.4 GHz band signal when the signal source is input to the signal generation circuit. Thus, as illustrated in FIG. 8, the length L3 of the portion 131 may be set less than the preset threshold, and there is no need for the fourth capacitor C4 to generate the signal of 2.4 GHz.

Figure 9:
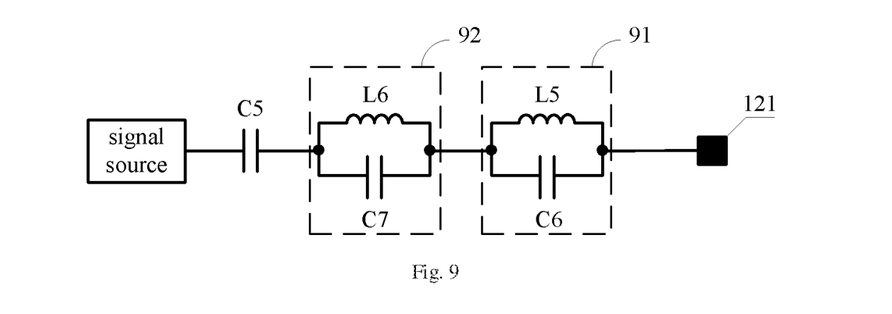
FIG. 9 is a schematic diagram illustrating a signal generation circuit according to another exemplary embodiment of the present disclosure.

As illustrated in FIG. 9, the signal generation circuit may include a first resonance circuit 91, a second resonance circuit 92 and a fifth capacitor C5. The first resonance circuit 91 is connected to the second resonance circuit 92 in series, and the first resonance circuit 91 is connected between the feed point 121 and the second resonance circuit 92. The second resonance circuit 92 is connected to the fifth capacitor C5 in series. The first resonance circuit 91 includes a sixth capacitor C6 and a fifth inductor L5. The second resonance circuit 92 includes a seventh capacitor C7 and a sixth inductor L6. When the fifth capacitor C5 is connected to the signal source, the first resonance circuit 91 may generate the L5 band signal, and the second resonance circuit 92 may generate the 2.4 GHz band signal.

For example, parameter values of respective components in the signal generation circuit illustrated in FIG. 9 may be set as Table 4.

TABLE 4

| component | value |
| --- | --- |
| fifth capacitor C5 | 0.5 pF |
| sixth capacitor C6 | 4.7 pF |
| seventh capacitor C7 | 0.3 pF |
| fifth inductor L5 | 2.7 nH |
| sixth inductor L6 | 8 nH |

It should be noted that, the parameter values of respective components (capacitors and inductors) illustrated in FIG. 9 may be flexibly adjusted according to practical situation, which is not limited in the present disclosure.

The present disclosure further provides an electronic device. The electronic device may include a processor and an antenna component according to any one the above-mentioned embodiments. With respect to the description of the antenna component in the electronic device, reference may be made to the foregoing embodiments.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An antenna component for use in an electronic device, the antenna component comprising:
    a conductive frame including a first conductive frame section and a second conductive frame section with a slit therebetween, wherein a feed point is provided on the first conductive frame section, the first conductive frame section includes an extension portion from the feed point to an end away from the silt, and a groove is formed by the extension portion and a first ground element, wherein the slit is configured to implement signal radiation of the antenna component;
    a signal generation circuit electronically connected to the feed point, and configured to generate an L5 band signal when a signal source is input to the signal generation circuit, such that the groove generates an L1 band signal, the L5 band signal corresponding to a frequency of 1176.45 MHz, and the L1 band signal corresponding to a frequency of 1575 MHz,
    wherein the signal generation circuit is further configured to generate a 2.4 GHz band signal when the signal source is input to the signal generation circuit,
    wherein the signal generation circuit comprises a first resonance circuit, a second resonance circuit and a first capacitor, the first resonance circuit is connected to the second resonance circuit in series, and the first resonance circuit is connected between the feed point and the second resonance circuit; the second resonance circuit is connected to the first capacitor in series, the first resonance circuit comprises a second capacitor and a first inductor, and the second resonance circuit comprises a third capacitor and a second inductor, and wherein, when the first capacitor is connected to the signal source, the first resonance circuit is configured to generate the L5 band signal, and the second resonance circuit is configured to generate the 2.4 GHz band signal.

2. The antenna component according to claim 1, wherein, when the signal source is input to the signal generation circuit, the groove is further configured to generate a 5 GHz band signal;

a fundamental mode of the groove is configured to generate the L1 band signal, and a high order mode of the groove is configured to generate the 5 GHz band signal.

3. The antenna component according to claim 1, wherein the second conductive frame section is electronically connected to a second ground element, and a length of a portion of the second conductive frame section exceeding beyond the second ground element in an extending direction of the second conductive frame section is less than a preset threshold; and the antenna component further comprises:

a fourth capacitor, wherein a first end of the fourth capacitor is connected to the first conductive frame section, and a second end of the fourth capacitor is grounded;

wherein the fourth capacitor is configured to generate the 2.4 GHz band signal when the signal source is input to the signal generation circuit.

4. The antenna component according to claim 1, wherein:
the second conductive frame section is electronically connected to a second ground element, and a length of a portion of the second conductive frame section exceeding beyond the second ground element in an extending direction of the second conductive frame section is greater than a preset length; and the portion of the second conductive frame section exceeding beyond the second ground element is configured to generate the 2.4 GHz band signal when the signal source is input to the signal generation circuit.

5. The antenna component according to claim 4, wherein the preset length is no less than 10 mm.

6. The antenna component according to claim 4, further comprising:

a conductive branch, located between the first ground element and the portion of the second conductive frame section exceeding beyond the second ground element;

wherein, when the signal source is input to the signal generation circuit, a distance between the conductive branch and the second conductive frame section and a length of the conductive branch in a preset direction are associated with a frequency of any signal generated by the signal generation circuit, the groove, and the portion of the second conductive frame section exceeding beyond the second ground element.

7. The antenna component according to claim 6, wherein the conductive branch comprises at least one of: a metal piece, a pattern directly formed by laser forming, and a flexible printed circuit.

8. The antenna component according to claim 1, wherein the first ground element comprises at least one of: a frame of the electronic device, a screen module, and a printed circuit board.

9. The antenna component according to claim 1, wherein a length of the groove is no less than 20 mm.

10. An electronic device comprising an antenna component, wherein the antenna component comprises:

a conductive frame including a first conductive frame section and a second conductive frame section with a slit therebetween, wherein a feed point is provided on the first conductive frame section, the first conductive frame section includes an extension portion from the feed point to an end away from the silt, and a groove is formed by the extension portion and a first ground element, wherein the slit is configured to implement signal radiation of the antenna component;

a signal generation circuit electronically connected to the feed point, and configured to generate an L5 band signal when a signal source is input to the signal generation circuit, such that the groove generates an L1 band signal, the L5 band signal corresponding to a frequency of 1176.45 MHz, and the L1 band signal corresponding to a frequency of 1575 MHz, wherein the signal generation circuit is further configured to generate a 2.4 GHz band signal when the signal source is input to the signal generation circuit, wherein the signal generation circuit comprises a first resonance circuit, a second resonance circuit and a first capacitor, the first resonance circuit is connected to the second resonance circuit in series, and the first resonance circuit is connected between the feed point and the second resonance circuit; the second resonance circuit is connected to the first capacitor in series, the first resonance circuit comprises a second capacitor and a first inductor, and the second resonance circuit comprises a third capacitor and a second inductor, and wherein, when the first capacitor is connected to the signal source, the first resonance circuit is configured to generate the L5 band signal, and the second resonance circuit is configured to generate the 2.4 GHz band signal.

11. The electronic device according to claim 10, wherein, when the signal source is input to the signal generation circuit, the groove is further configured to generate a 5 GHz band signal;

a fundamental mode of the groove is configured to generate the L1 band signal, and a high order mode of the groove is configured to generate the 5 GHz band signal.

12. The electronic device according to claim 10, wherein the second conductive frame section is electronically connected to a second ground element, and a length of a portion of the second conductive frame section exceeding beyond the second ground element in an extending direction of the second conductive frame section is less than a preset threshold; and the antenna component further comprises:

a fourth capacitor, wherein a first end of the fourth capacitor is connected to the first conductive frame section, and a second end of the fourth capacitor is grounded;

wherein the fourth capacitor is configured to generate the 2.4 GHz band signal when the signal source is input to the signal generation circuit.

13. The electronic device according to claim 10, wherein:
the second conductive frame section is electronically connected to a second ground element, and a length of a portion of the second conductive frame section exceeding beyond the second ground element in an extending direction of the second conductive frame section is greater than a preset length; and the portion of the second conductive frame section exceeding beyond the second ground element is configured to generate the 2.4 GHz band signal when the signal source is input to the signal generation circuit.

14. The electronic device according to claim 13, wherein the preset length is no less than 10 mm.

15. The electronic device according to claim 13, wherein the antenna component further comprises:
- a conductive branch located between the first ground element and the portion of the second conductive frame section exceeding beyond the second ground element;
- wherein, when the signal source is input to the signal generation circuit, a distance between the conductive branch and the second conductive frame section and a length of the conductive branch in a preset direction are associated with a frequency of any signal generated by the signal generation circuit, the groove, and the portion of the second conductive frame section exceeding beyond the second ground element.

\* \* \* \* \*